United States Patent [19]

Weber

[11] Patent Number: 4,560,412

[45] Date of Patent: Dec. 24, 1985

[54] WHITE CEMENT PRODUCTION

[75] Inventor: Paul Weber, Oelde, Fed. Rep. of Germany

[73] Assignee: Krupp Polysius AG, Beckum, Fed. Rep. of Germany

[21] Appl. No.: 592,816

[22] Filed: Mar. 23, 1984

[30] Foreign Application Priority Data

Apr. 2, 1983 [DE] Fed. Rep. of Germany ....... 3312029

[51] Int. Cl.⁴ .............................................. C04B 7/08
[52] U.S. Cl. ..................................... 106/101; 106/100
[58] Field of Search ........................ 106/100, 103, 101

[56] References Cited

FOREIGN PATENT DOCUMENTS

| | | | |
|---|---|---|---|
| 1942537 | 6/1970 | Fed. Rep. of Germany | 106/100 |
| 56-124436 | 9/1981 | Japan | 106/100 |
| 959446 | 6/1964 | United Kingdom | 106/100 |
| 991112 | 5/1965 | United Kingdom | 106/100 |
| 307990 | 9/1971 | U.S.S.R. | 106/100 |

*Primary Examiner*—William R. Dixon, Jr.
*Assistant Examiner*—Steven Capella
*Attorney, Agent, or Firm*—Learman & McCulloch

[57] ABSTRACT

The invention relates to a method of producing white cement in which a reducing atmosphere is maintained over the entire length of a rotary kiln and precalcination takes place in a preheater supplied with heat exhaust gases from the kiln. Additional fuel is delivered to the preheater in such quantity that the CO contained in the kiln exhaust gases is burnt. As a result the essential reduction processes take place reliably in the rotary kiln without any problems occurring in the preheater as a result of a high CO content.

4 Claims, 2 Drawing Figures

WHITE CEMENT PRODUCTION

The invention relates to a method and apparatus for producing white cement.

BACKGROUND OF THE INVENTION

In the production of white cement the raw materials must have a high degree of purity and oil or gas (not coal) are used for firing in order to avoid impurities caused by ash. Moreover the firing is carried out in a reducing atmosphere in order to prevent the formation of the trivalent ferric ion which has a strong colouring power. In the production of white cement the following reduction reactions of colouring heavy metal oxides take place in a reducing kiln atmosphere:

$$Fe_3O_4 + CO \rightarrow 3FeO + CO_2$$

$$Fe_2O_3 + CO \rightarrow 2FeO + CO_2$$

$$MnO_2 + CO \rightarrow MnO + CO_2$$

$$2CrO_3 + 2CO \rightarrow Cr_2O_3 + 2CO_2 + \tfrac{1}{2}O_2$$

In the previously known methods for producing white cement, however, care must be taken to ensure that the CO content at the kiln outlet (i.e. in the region of the burner) is selected so that it is not too high, since otherwise the CO produced by the reducing atmosphere passes into the preheater where it is converted with difficulty, represents an additional heat loss and in certain circumstances represents a danger to the electrostatic filter.

In the known methods, therefore, in order to avoid these difficulties the reducing atmosphere is produced only in the outlet region of the rotary kiln, whilst in the remaining region of the rotary kiln the atmosphere is neutral or even contains an excess of oxygen.

The object of the invention is to provide a method of producing white cement in such a way that the reduction reactions referred to above take place particularly reliably and completely in the rotary kiln without the problems described above occurring in the preheater as a result of a CO content in the exhaust gases from the rotary kiln.

SUMMARY OF THE INVENTION

While the reducing atmosphere is maintained over the entire length of the rotary kiln, the reduction reactions referred to above of heavy metal oxides having a strong colouring power take place reliably and completely, this being an essential prerequisite for the production of qualitatively high-grade white cement. On the other hand, the maintenance of a reducing atmosphere over the entire length of the kiln leads to a considerable CO content in the exhaust gases from the kiln. In the method according to the invention this CO is burnt out in the preheater and additional fuel is supplied for precalcination of the raw material.

In this way not only are the dangers associated with a high CO content in the preheater avoided but at the same time the precalcination (i.e. the deacidification of the raw material before entry into the rotary kiln) is assisted by the oxygen enrichment in the precalcination region which is necessary for the combustion.

In a particularly advantageous embodiment of the method according to the invention the air for combustion which is supplied to the preheater and/or the air for combustion which is supplied to the rotary kiln are preheated by the exhaust gases from the preheater. By means of such exhaust gas recovery a large proportion of the heat of exhaust gases is transferred to the air for combustion which is thereby preheated and then delivered to the rotary kiln or to the preheater. In this way a particularly low heat consumption can be achieved with a high degree of deacidification and a resulting reduced expenditure on plant.

The quantity of fuel and air supplied to the rotary kiln is advantageously such that the exhaust gases from the rotary kiln have a CO content of 0.5 to 2.0% by volume, preferably 0.7 to 1.5% by volume. With a constant setting and geometry of the burner CO is produced by reducing the excess air, and thus with the same quantity of fuel less secondary air is supplied.

The CO thus produced is completely converted in the precalcination zone of the preheater. For this purpose sufficient air for combustion is delivered to the precalcination zone as tertiary air to enable all the fuel to be burnt with an excess air coefficient (after the precalcination zone) of 1.15.

As the excess of air is reduced at the main burner, i.e. less secondary air, the quantity of gas at the kiln inlet is reduced. Accordingly the quantity of tertiary air delivered to the precalcination zone must be increased in order for all the fuel to react completely in the precalcination zone.

The method of operation according to the invention also has a positive effect in that the reduced quantity of gas at the furnace inlet causes less high-grade heat to be drawn out of the rotary kiln into the precalcination zone, which results in a reduction in the total heat consumption. With very high CO contents the quantity of gas at the kiln inlet is only slightly reduced; at the same time more heat is led out of the rotary kiln into the precalcination zone by unburnt CO, which causes the heat consumption to rise again. Therefore, depending upon the given conditions, the optimum is generally to be found at a CO content (at the kiln inlet) between 0.5 and 2.0%.

THE DRAWINGS

DETAILED DESCRIPTION

Figure 1:
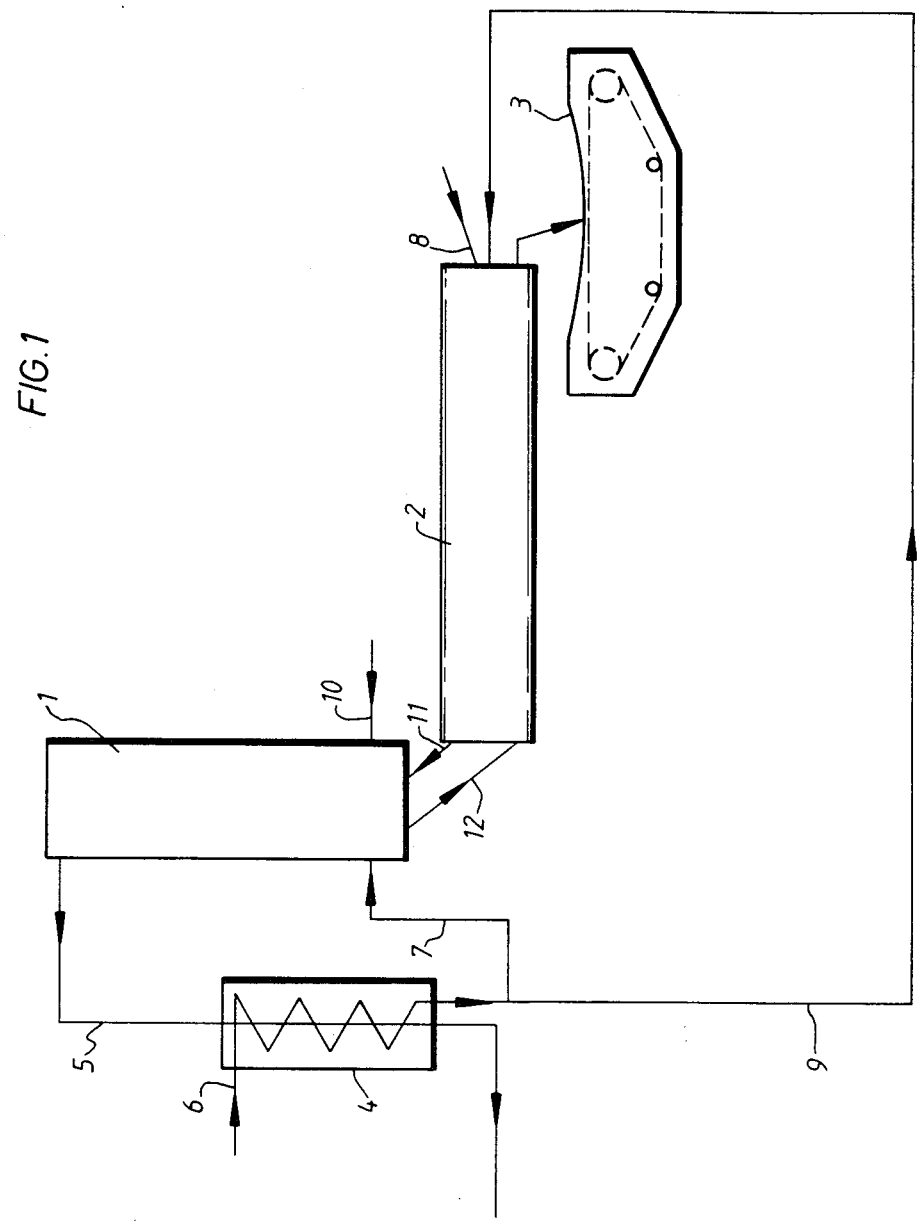
FIG. 1 is a representation of apparatus for carrying out the method according to the invention.

The apparatus according to FIG. 1 contains a heat exchanger preheater 1 which is shown only in block form and is preferably constructed as a multi-stage cyclone heat exchanger. A rotary kiln 2 is arranged after the heat exchanger 1, and a cooler 3 in which the clinker is quenched in a water bath is connected to the rotary kiln 2. The junction between the rotary kiln 2 and the cooler 3 is constructed in such a way that the clinker which is burnt in a reducing atmosphere in the rotary kiln 2 does not come into contact with atmosphere when passing into the water bath in the cooler. For this purpose the discharge chute from the rotary kiln 2 can for example open directly into the water bath in the cooler 3.

The apparatus also contains a recuperator 4 which serves to transfer the heat contained in the exhaust gases (duct 5) from the heat exchanger 1 to the air for combustion (duct 6). The air for combustion which has been preheated in this way is delivered on the one hand (duct 7) to the lowest part of the heat exchanger 1 forming the precalcination zone (so-called tertiary air) and on the other hand is delivered as so-called secondary air to the main burner 8 of the rotary kiln 2 (duct 9).

Fuel for thorough deacidification (precalcination) of the raw material preheated in the heat exchanger 1 is also delivered to the precalcination zone at 10. The kiln exhaust gases delivered from the rotary kiln 2 to the peheater (heat exchanger 1) are designated by 11, and the largely deacidified material which has been highly preheated and enters the rotary kiln 2 from the heat exchanger 1 is designated by 12.

As has been explained already, a reducing atmosphere is maintained over the entire length of the rotary kiln 2, whilst the quantity of secondary air delivered via the duct 9 is correspondingly reduced.

Figure 2:
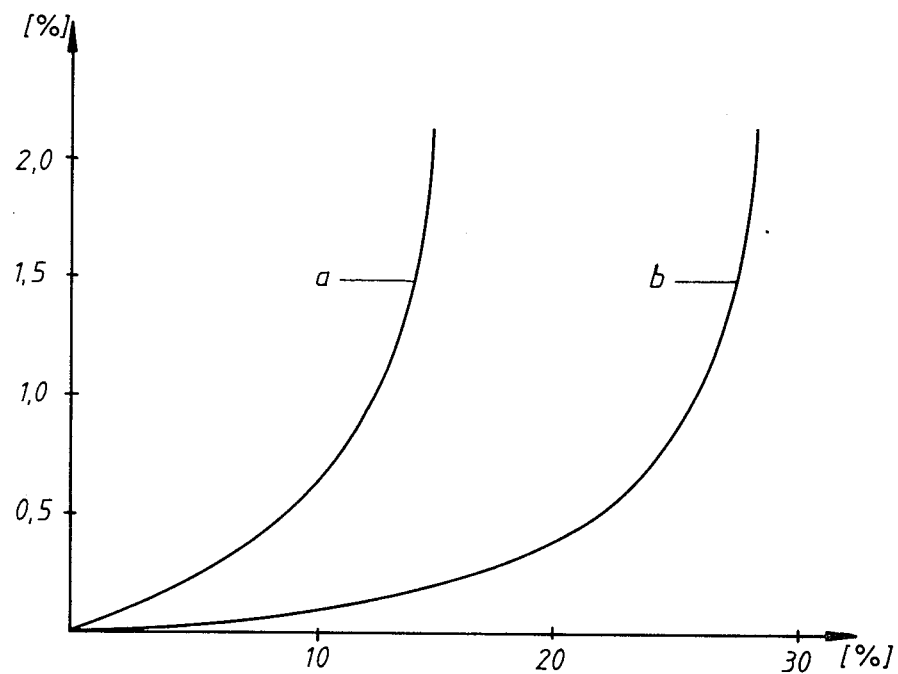
FIG. 2 is a diagram illustrating the dependence of the quantity of tertiary air on the CO concentration in the kiln exhaust gas.

FIG. 2 shows the relationship between the CO concentration in the kiln exhaust gas plotted in the ordinate and the quantity of tertiary air (as a percentage of the total quantity of air) delivered via the duct 7 and plotted in the abscissa. Curve a shows the ratios for a two-stage cyclone heat exchanger and curve b shows the ratios for a four-stage cyclone heat exchanger.

In order to explain the invention further the following table shows the quantities of gas and the temperatures for an average CO content at the kiln inlet of 1.0% by volume for a two-stage and a four-stage preheater. It is assumed here that 50% of the total quantity of fuel is added to the two-stage preheater in the precalcination zone and 30% in the case of the four-stage preheater. In both cases the exhaust gas recovery is assumed to be 70%.

|  | Two-stage preheater | Four-stage preheater |
| --- | --- | --- |
| CO content at kiln inlet (%) | 1.0 | 1.0 |
| Excess of air at kiln inlet (—) | 1.02 | 1.02 |
| Quantity of gas at kiln inlet ($m^3_n$/kg clinker) | 0.8490 | 1.0775 |
| Quantity of secondary air ($m^3_n$/kg clinker) | 0.7157 | 0.9112 |
| Temperature of secondary air (°C.) | 447 | 332 |
| Quantity of tertiary air ($m^3_n$/kg clinker) | 0.9555 | 0.5919 |
| Temperature of tertiary air (°C.) | 447 | 332 |
| Excess of air in precalcination zone (—) | 1.15 | 1.15 |
| Quantity of exhaust gas ($m^3_n$/kg clinker) | 2.1219 | 2.0341 |
| Temperature of exhaust gas (°C.) | 630 | 465 |
| Degree of deacidification (%) | 88.46 | 86.11 |
| Total heat requirement (kcal/kg clinker) | 1345 | 1223 |

I claim:

1. In a method of producing white cement wherein raw material is precalcined in a preheater by hot exhaust gases from a kiln and the preheated raw material is fired in the kiln, the improvement including maintaining a reducing atmosphere in said kiln over the entire length thereof, and introducing fuel to the preheater in sufficient quantity to burn CO contained in the kiln exhaust gases.

2. The method according to claim 1 including preheating combustion air delivered to said kiln.

3. The method according to claim 2 wherein said combustion air is preheated by air from said preheater.

4. The method according to claim 1 including maintaining the reducing atmosphere in said kiln at such level that the CO in said exhaust gases is at least 0.5% by volume.

* * * * *